UNITED STATES PATENT OFFICE.

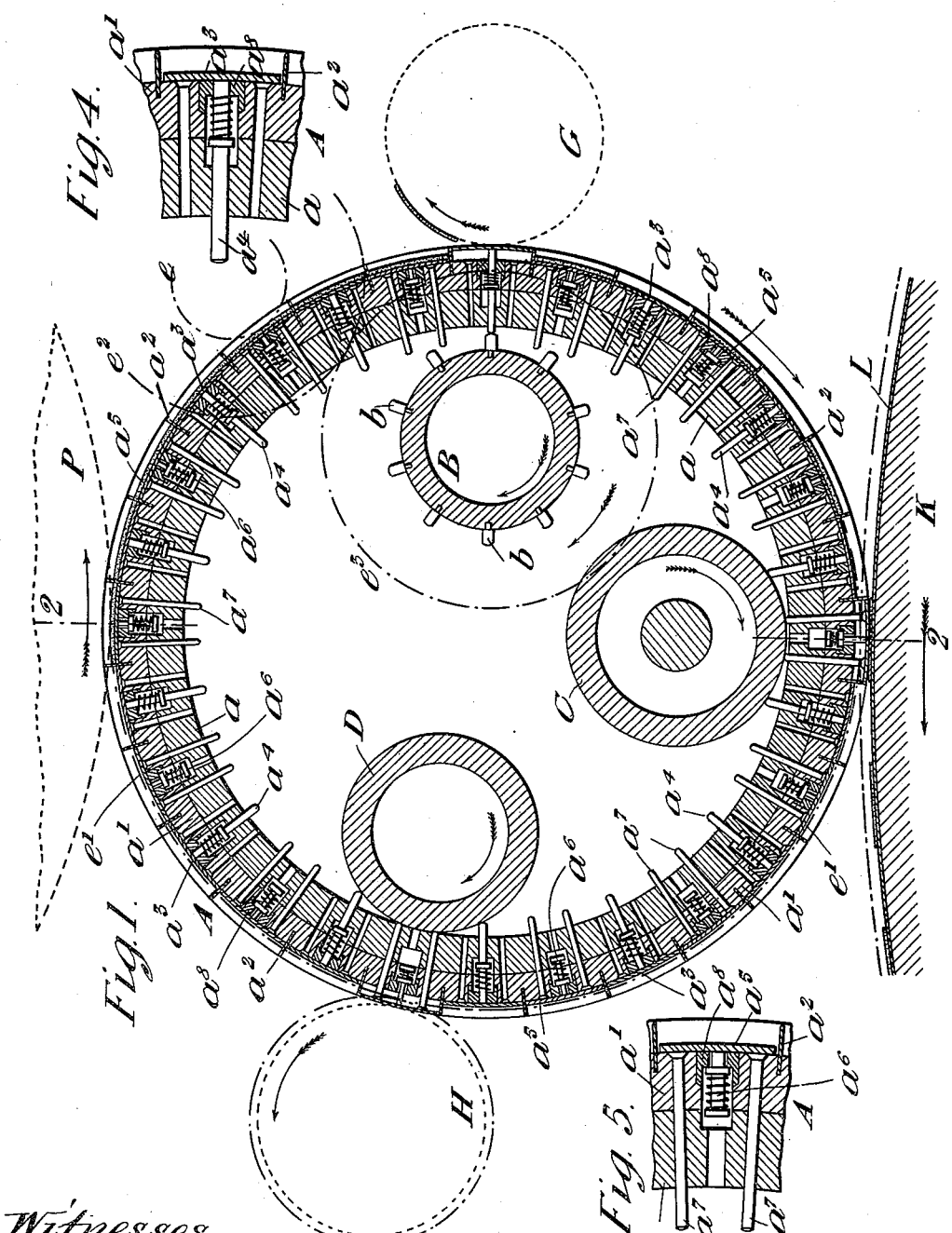

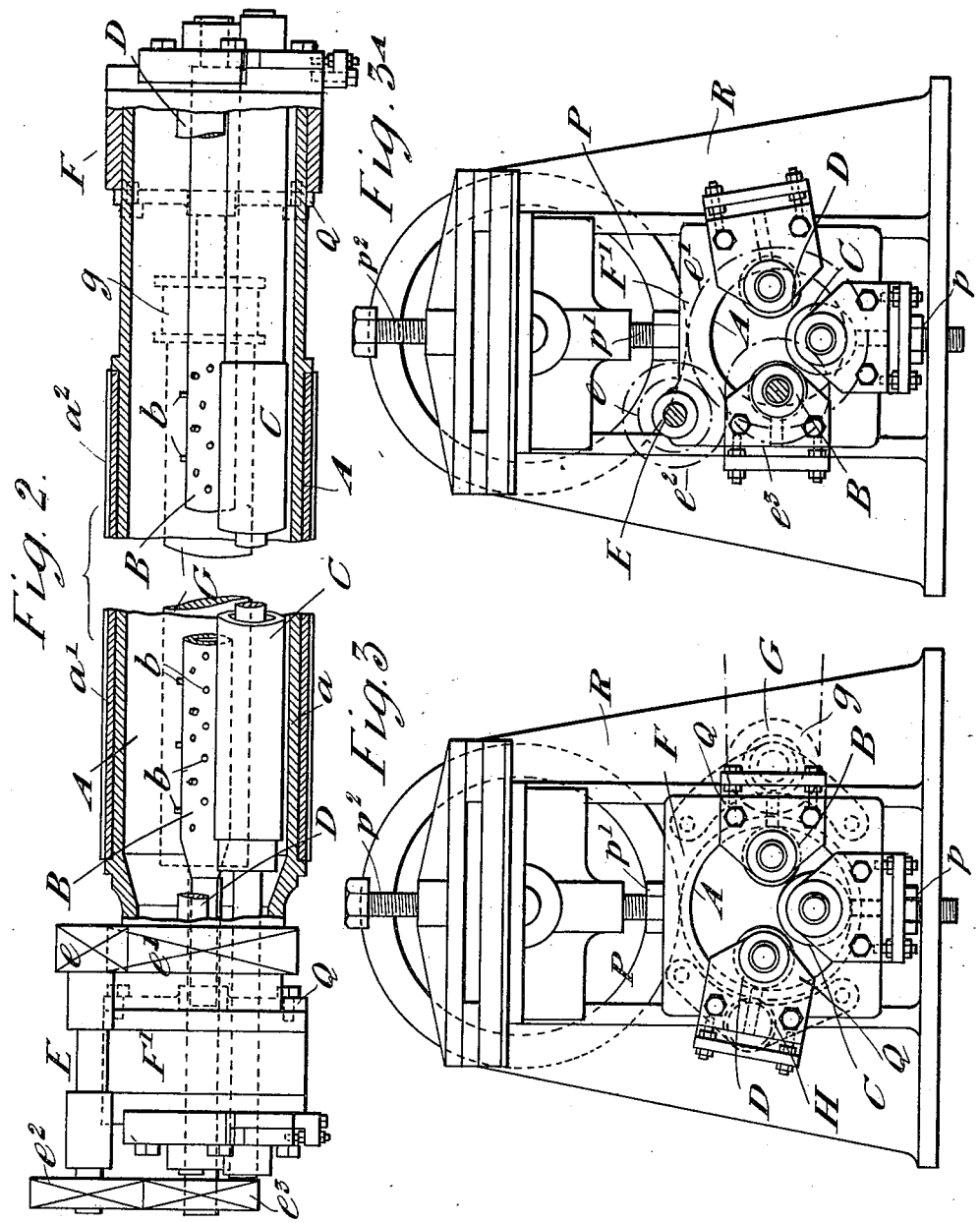

FREDERICK WALTON, OF LONDON, ENGLAND.

APPARATUS FOR MANUFACTURING MOSAIC FLOOR-CLOTH.

SPECIFICATION forming part of Letters Patent No. 626,117, dated May 30, 1899.

Application filed July 8, 1897. Serial No. 643,862. (No model.)

*To all whom it may concern:*

Be it known that I, FREDERICK WALTON, manufacturer, a citizen of England, residing at No. 114 Holborn, in the city of London, England, have invented new and useful Improvements in Apparatus for Manufacturing Mosaic Floor-Cloth, (for which I have obtained Letters Patent in Great Britain, No. 198, dated January 4, 1897; in Austria, No. 219/47, dated January 22, 1897, and in France, No. 262,789, dated January 4, 1897,) of which the following is a specification.

Apparatus for manufacturing mosaic floor-cloth has been proposed wherein a drum having a number of projecting pins had arranged around parts of its circumference several sets of cutting-cylinders and pressing-rollers to cut tesseræ from traveling sheets of variously-colored floor-cloth material to force the tesseræ required for the pattern onto a backing fabric traveling around with the drum and to reject the tesseræ not required and return them to be again converted into sheet. In Patent No. 523,610, granted to me July 24, 1894, I have shown and described one form of apparatus for accomplishing this work. My present invention relates to improvements in apparatus of this kind, especially in the construction of the cutting-cylinder, whereby I render it more efficient.

Each sheet of colored floor-cloth material passes between a cutting-cylinder and an iron pressing-roller by which the whole sheet is cut into tesseræ, filling all the spaces in the circumference of the cutting-cylinder. As this turns around the stems of the plates which form the bottoms of the tesseræ spaces from which tesseræ are to be rejected are acted upon by pins projecting from an internal eccentric cylinder, so as to push these tesseræ quite out of the spaces which they occupy, these tesseræ being cleared away by an external revolving brush. As the cutting-cylinder continues to revolve until it comes to the line of contact with the main drum, all the plates are pushed out by the passage of these stems or pins over an internal cylinder, the tesseræ which remained in the spaces after passing the brush being thus pressed onto the backing fabric carried on the main drum. At a further part of the revolution of the cutting-cylinder all the plates are pushed by an internal cylinder acting on their stems and pins a little beyond the surface of the cutting-cylinder and meet a revolving roller covered with plush or equivalent material served with a lubricant, such as petroleum spirit, the plates being thus lubricated, so that the tesseræ do not adhere to them.

As described in the specification of my British Patent No. 16,043 of 1890, the sheet of mosaic floor-cloth in passing from the main drum is pressed by rollers against a heated roller, a continuous apron of vulcanized caoutchouc being interposed between the pressing-rollers and the sheet. To prevent the sheet from adhering to the roller, its surface is lubricated with paraffin-wax applied by a roller of felt or like material served with the lubricant.

Figure 1 is an enlarged transverse section of the cutting-cylinder and part of the main drum, the pressing, brushing, and lubricating cylinders being indicated by dotted lines. Fig. 2 is a longitudinal section of the cutting-cylinder on the line 2 2 of Fig. 1, but on a smaller scale, with parts in elevation, showing at the one end the gearing for driving the cylinder A and at the other bearings for the cylinders B, C, and D. Fig. 3 is a view of the right-hand end bearing of a cutting-cylinder provided with internal eccentric cylinders for moving the bottom plates of the tesseræ spaces. Fig. 3$^a$ is a view of the left-hand end bearing of the same. Fig. 4 is a part section of the cutting-cylinder, showing one form of spring-stem for some of the bottom plates; and Fig. 5 is a part section showing another form of the spring-stem for others of the bottom plates acted on by pushing-pins.

The cylinder A consists of an inner shell $a$ and an outer shell $a'$, in which are held the cutting-blades $a^2$, arranged according to pattern all around the circumference. The cutting-cylinder is conveniently constructed in the following, which is a well-known, manner: A cylindrical shell of metal having thickness equal to that of the linoleum sheet to be cut and to the distance which the cutting-blades are to project is cut into tesseræ according to the desired pattern, and these tesseræ are placed in a concave mold, being a segment, preferably one-third, of the cylinder, circumscribing the blades when they project. The cutting-blades, each having part of its surface tinned, are set between the tesseræ, their edges next the concave mold and their tinned parts projecting inward. The whole is then covered by a convex segmental cover, and then molten white-metal, which is fused at a comparatively low temperature — such, for instance, as type-metal—is poured into the space between the mold and cover, this metal becoming soldered to the tinned parts of the cutting-blades. In this way are formed cylindrical segments of the white-metal with the cutting-blades projecting from them in positions suited to form the desired pattern. These segments together form the outer shell $a'$, being fixed on the inner cylindrical shell $a$, the whole forming the cutting-cylinder A, which, being made as above described, has the pattern repeated three times around it. Each space inclosed by the cutting-blades has a central hole and also two or more smaller holes, all passing through both shells, and the plate $a^3$, which forms the bottom of each of those spaces from which tesseræ are to be extruded as forming no part of the pattern, has attached to it a long stem $a^4$, passing through both shells and projecting inwardly beyond the inner shell, as shown in Fig. 4; but in this case there are no pushing-pins. The plate $a^5$, on the other hand, which forms the bottom of each space containing tesseræ that are to form part of the pattern, has attached to it a short stem $a^6$, as shown in Fig. 5, and has arranged under it two or more pushing-pins $a^7$, which pass through the smaller holes of both shells, projecting inwardly beyond the inner shells. The stems of both kinds $a^4$ and $a^6$ are fitted to slide through bushes $a^8$, which are driven into holes of the outer shell $a'$ with certain tightness, but not such as to prevent them from being withdrawn for repairs or alterations when force is applied, and they are made with collars and have springs so arranged as to draw them inward. The pushing-pins $a^7$, which are not attached to the bottom plates, are made with small collars at their heads to prevent them from falling out when they are brought by revolution of the cylinder A to an inverted position.

The cylinder A, which is open at both ends, is journaled its right end in a plate F and its left end in a plate F', both these plates being fitted to slide in frames R, which also have sliding bearings for the shafts of the pressing-roller P, the exact position of the axes of the cylinders A and P being determined by adjusting-screws and lock-nuts $p\ p'\ p^2$.

Within the cylinder A are mounted three cylinders B, C, and D, having their ends journaled in bearings Q, which are fixed on the plates F and F'. The two cylinders C and D are free to revolve and are driven only by the frictional contact of the stems $a^4$ and pushing-pins $a^7$; but the cylinder B is driven at a definite speed relatively to A, for which purpose a counter-shaft E, mounted in bearings on the plate F, has at its one end a pinion $e$, gearing with a wheel $e'$ on the cylinder A, and at its other end a wheel $e^2$, gearing with a wheel $e^3$ on the projecting end of the shaft of the cylinder B. The cylinder B has arranged all over its periphery screw-threaded holes, in any of which can be screwed pegs $b$, these pegs being in such positions that as the cylinders A and B revolve each peg $b$ comes in line with one of the long stems $a^4$, the meeting ends of the peg and the stem moving at the same rate. As different patterns require different arrangements of the stems $a^4$ and pushing-pins $a^7$ in the cylinder A, many of these different patterns can be provided for by corresponding arrangements of the pegs $b$ on one cylinder B without requiring a separate cylinder for each of these patterns. The cylinder B is so geared to the cylinder A and the pegs $b$ thereon are so arranged relatively to the stems $a^4$, which have to be acted on by the pegs, as to fulfil the condition stated. It should be understood that one revolution of cylinder A cuts, say, three repetitions of one pattern, and therefore if cylinder B be geared to cylinder A, so as to make three revolutions while the latter makes one, the pegs $b$ will act on the stems $a^4$ of each pattern.

Touching the cylinder A is mounted the pressing-cylinder P, preferably made of cast-iron. At the one side of A is mounted a revolving brush G, having on its axis a pulley $g$, driven from any convenient shaft of the machine by a belt. On the other side of A is mounted a lubricating-cylinder H, which is clothed with plush or such like fabric and occasionally served with a little lubricant, such as petroleum spirit. K is the main drum of the machine, carrying on it the backing fabric L, through which project numerous pins fixed on the drum. The cylinder A is driven by teeth on the drum K gearing with the teeth $e'$, so that the two circumferences move at equal speed. The revolving brush G is driven at a considerably more rapid speed, while the lubricating-cylinder H is driven from the teeth $e'$ on A at a surface speed a little greater than that of A.

The apparatus operates in the following manner: As the parts revolve in the direction of the arrows a sheet of colored floor-cloth material passing between the pressing-cylinder P and the cutting-cylinder A is entirely cut into tesseræ, which occupy all the spaces of A that pass the line of contact of the two cylinders. All the longer stems $a^4$ come in their turn to be acted on by the pegs $b$, pushing them outward and so extruding all the tesseræ that are not required for the pattern, these being swept away by the brush G into a receptacle below. The tesseræ occupying the spaces which have bottom plates with the short stems $a^6$ and under them the pushing-pins $a^7$ remain in those spaces, the pushing-pins $a^7$ being so arranged as not to be acted on by the pegs $b$; but when these pins come in contact with the cylinder C they are pushed outward, pressing the tesseræ on the backing L, on which they are held by the pins of the drum K, projecting through the backing. As the front pushing-pins $a^7$ of each tesseræ space are acted on by C a little before the hinder pins, the tesseræ is pressed out of the space and onto the backing, first, in a slightly-inclined attitude, being afterward flattened down on the backing when the hinder pushing-pins are acted on. The long stems $a^4$ are also pressed outward by C, but as the spaces to which they belong are empty no effect is produced. The cylinder C has its surface not quite in contact with the inner surface of A, so that the bottom plates are not pushed out by C beyond the edges of the cutting-blades of A. When the long stems $a^4$ and pushing-pins $a^7$ come in contact with the cylinder D, which is in close contact with the interior of A, the bottom plates of the tesseræ spaces are all pushed out, so that their faces are a little beyond the edges of the cutting-blades and they are lubricated by contact with the cylinder H, the lubrication of their surfaces preventing adhesion of the tesseræ to them.

Having thus described the nature of this invention and the best means I know for carrying the same into practical effect, I claim—

1. In a machine for making mosaic floor-cloth the combination with a pressing-roll and receiving-drum, of a cutting-cylinder revolving in proximity to their peripheries having radially-extending knives on its outer periphery, plates movably supported in the spaces between the knives, spring-controlled stems connected to the bottoms of certain of said plates, a cylinder revoluble within the said cutting-cylinder and operating to force said plates outward, push-pins engaging the bottoms of certain other of said plates and projecting into the interior of the cutting-cylinder, and an idler roll or cylinder supported in said cutting-cylinder and adapted, in the revolution of the latter, to engage said push-pins to project them, and the plates engaged by them, outward toward the periphery of the receiving-drum, substantially as described.

2. In a machine for making mosaic floor-cloth the combination with a pressing-roll and receiving-drum, of a cutting-cylinder revolving in proximity to their peripheries having radially-extending knives on its outer periphery, plates movably supported in the spaces between the knives, spring-controlled stems connected to the bottoms of certain of said plates and projecting into the interior of the cutting-cylinder, a cylinder revolubly supported within the cutting-cylinder and having pegs removably held thereon positioned to engage said stems to force them outward, push-pins engaging the bottoms of certain other of said plates and projecting into the interior of the cutting-cylinder, and an idler roll or cylinder supported in said cutting-cylinder and adapted, in the revolution of the latter, to engage said push-pins to project them, and the plates engaged by them, outward toward the periphery of the receiving-drum, substantially as described.

3. In a machine for making mosaic floor-cloth the combination with a cutting-cylinder having radially-extending knives on its outer periphery, plates movably supported in the spaces between the knives, a pressing-roll revolving in proximity to the periphery of the cutting-cylinder and operating with the knives on said cylinder to cut tesseræ from material interposed between them and to force same into the spaces between the knives, means operating to project certain of said plates outward carrying tesseræ which are not needed, a brush revolving in proximity to the cutting-cylinder and adapted to remove the tesseræ from said projected plates, a receiving-drum revolving in proximity to the periphery of the cutting-cylinder, means for projecting certain other of said plates outward to deposit the tesseræ carried thereby onto the backing of the receiving-drum, a lubricating-roller revolving in proximity to the periphery of said cutting-cylinder and means for projecting all of the plates outward to be lubricated by said roller, substantially as described.

4. In a machine for making mosaic floor-cloth, the combination with a pressing-roll and receiving-drum, of a cutting-cylinder revolving in proximity to their peripheries having radially-extending knives on its outer periphery, plates movably supported in the spaces between the knives, spring-controlled stems connected to the bottoms of certain of said plates and projecting into the interior of said cutting-cylinder, a cylinder revolubly supported within the cutting-cylinder having arranged over its periphery screw-threaded holes corresponding, or in alinement with the centers of the tesseræ spaces of the cutting-cylinders, threaded pegs adapted to be screwed into said holes and positioned to engage said stems to force them outward, and means operating to project certain other of said plates outward toward the periphery of the receiving-drum, substantially as described.

5. In a machine for making mosaic floor-cloth the combination with the cutting-cylinder having radially-extending knives on its outer periphery, and of a receiving-drum, of a plurality of means for projecting the tesseræ carried by the cutting-cylinder onto the receiving-drum, each of which comprises a recessed portion formed in the periphery of the cutting-cylinder in the space between two knives, a bushing removably secured in the outer part of such recessed portion having an opening, a plate movably supported in the space between the knives, a spring-controlled stem working in the opening in the bushing secured to the bottom of said plate and normally holding it against the periphery of the cutting-cylinder, push-pins engaging the bottom of said plate and projecting into the interior of the cylinder, and a positively-driven cylinder and frictionally-driven cylinders within the cutting-cylinder operating to force said pins outward against the resistance of the spring of said stem, substantially as described.

6. In a machine for making mosaic floor-cloth the combination with the cutting-cylinder having radially-extending knives on its outer periphery; of a plurality of means for ejecting from the cylinder unnecessary tesseræ each of which comprises a recessed portion formed in the periphery of the cutting-cylinder in the spaces between two knives, a bushing removably secured in the outer part of such recessed portion having an opening, plates movably supported in the space between the knives, a spring-controlled stem working in the opening in the bushing secured to the bottom of the plate and normally holding it against the periphery of the cutting-cylinder, said stem projecting into the interior of the cylinder, and a positively-driven cylinder with removable pegs, and two frictionally-driven cylinders within the cutting-cylinder operating to force said stem outward against the resistance of its spring, substantially as described.

In testimony whereof I have signed my name to this specification, in the presence of two subscribing witnesses, this 29th day of June, A. D. 1897.

FREDERICK WALTON.

Witnesses:
JNO. P. M. MILLARD,
JOSEPH LAKE.